United States Patent
Rapp et al.

(10) Patent No.: US 11,702,039 B2
(45) Date of Patent: Jul. 18, 2023

(54) WIPER DEVICE

(71) Applicant: Robert Bosch GmbH, Stuttgart (DE)

(72) Inventors: Harald Rapp, Buehl (DE); Adam Ugron, Budapest (HU); Andrija Terentic, Belgrad (RS); Denis Parenta, Buehl (DE); Matea Mikulic, Novi Beograd (RS); Najdan Jocic, Pancevo (RS); Nikola Dilparic, Cacak (RS); Raf Greunlinx, Zolder (BE); Sascha Geissler, Lichtenau (DE); Stijn Truyens, Tienen (BE); Tanja Bosnic, Belgrad (RS)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/571,180

(22) Filed: Jan. 7, 2022

(65) Prior Publication Data
US 2022/0219647 A1    Jul. 14, 2022

(30) Foreign Application Priority Data

Jan. 13, 2021   (DE) .................. 102021200239.0

(51) Int. Cl.
*B60S 1/34*   (2006.01)
*B60S 1/40*   (2006.01)
*B60S 1/38*   (2006.01)
*B60S 1/52*   (2006.01)

(52) U.S. Cl.
CPC .......... *B60S 1/3425* (2013.01); *B60S 1/4067* (2013.01); *B60S 1/4077* (2013.01); *B60S 1/3862* (2013.01); *B60S 1/524* (2013.01); *B60S 2001/4058* (2013.01)

(58) Field of Classification Search
CPC ...... B60S 1/3862; B60S 1/4067; B60S 1/407; B60S 1/4074; B60S 1/4077; B60S 1/524; B60S 2001/4035; B60S 2001/4061; B60S 2001/4058; B60S 1/3425
USPC ........................................ 15/250.32, 250.04
See application file for complete search history.

(56) References Cited

FOREIGN PATENT DOCUMENTS

| DE | 102011057118 | * | 7/2013 |
| FR | 2736025 | * | 1/1997 |
| FR | 3048396 | * | 9/2017 |

OTHER PUBLICATIONS

Machine translation of description portion of German publication 102011057118, published Jul. 2013 (Year: 2013).*

* cited by examiner

*Primary Examiner* — Gary K. Graham
(74) *Attorney, Agent, or Firm* — Michael Best & Friedrich LLP

(57) ABSTRACT

A wiper device (10) having a wiper arm adapter (16) and having a cover unit (30) which is mounted on the wiper arm adapter (16) so as to be pivotable about a pivot axis (36) between an open position (34) and a closed position (32) and which, in the closed position (32), at least partially covers the wiper arm adapter (16) in relation to an environment. The cover unit (30), in the closed position (32), is displaceable translationally between an unlocked position (38) and a locked position (40).

15 Claims, 6 Drawing Sheets

WIPER DEVICE

BACKGROUND OF THE INVENTION

A wiper device, in particular window wiper device, having a wiper arm adapter and having a cover unit which is mounted on the wiper arm adapter so as to be pivotable about a pivot axis between an open position and a closed position and which, in the closed position, at least partially covers the wiper arm adapter in relation to an environment, has already been proposed.

SUMMARY OF THE INVENTION

The invention is based on a wiper device, in particular window wiper device, having a wiper arm adapter and having a cover unit which is mounted on the wiper arm adapter so as to be pivotable about a pivot axis between an open position and a closed position and which, in the closed position, at least partially covers the wiper arm adapter in relation to an environment.

It is proposed that the cover unit, in the closed position, is displaceable translationally between an unlocked position and a locked position. The configuration according to the invention can enable an advantageously reliable operation of the wiper device. An automatic adjustment of the cover unit from the closed position into the open position can be particularly advantageously avoided. Furthermore, the configuration according to the invention can enable a wiper blade to be installed and/or removed in an advantageously simple and rapid manner.

A "wiper device" is intended to be understood as meaning preferably at least one part, preferably a substructure assembly, of a window wiper. In principle, the wiper device may also comprise the entire window wiper, in particular together with the wiper blade. The wiper device is preferably provided for use on a vehicle. "Provided" is intended to be understood as meaning preferably specially designed and/or specially equipped. The fact that an object is provided for a specific function is intended to in particular be understood as meaning that the object satisfies and/or carries out this specific function in at least one application state and/or operating state. The wiper device, in particular as part of the window wiper, is preferably provided for cleaning a surface, preferably a window on a vehicle. For cleaning a vehicle window, the wiper device is preferably coupled to a vehicle.

The wiper device preferably comprises a wiper arm. The wiper arm preferably comprises a wiper arm rod and the wiper arm adapter. Preferably, the wiper arm adapter has a longitudinal axis which is oriented at least substantially parallel to a longitudinal axis of the wiper arm rod. A "longitudinal axis" of an object is intended to be understood as meaning preferably an axis which is oriented parallel to a longest edge of a smallest geometrical cuboid which only just completely surrounds the object. The longitudinal axis preferably runs through a geometrical center point of the cuboid. "At least substantially parallel" is intended to be understood as meaning preferably an orientation of a direction relative to a reference direction, in particular in a plane, wherein the direction has a deviation in particular of less than 8°, advantageously less than 5° and particularly advantageously less than 2° in relation to the reference direction. The wiper arm adapter is preferably connected, in particular captively, preferably integrally, to the wiper arm rod. "Integrally" is intended to be understood as meaning preferably connected at least in an integrally bonded manner, for example by a welding process, an adhesive bonding process, a molding process and/or another process appearing expedient to a person skilled in the art, and/or advantageously formed in one piece, for example by production from a casting and/or by production in a single- or multi-component injection-molding method and advantageously from an individual blank.

The wiper device preferably comprises the wiper blade. The wiper blade preferably comprises the wiper blade adapter. The wiper blade adapter, in particular the wiper blade, is preferably mounted on the wiper arm adapter so as to be pivotable about a wiper blade adapter pivot axis, in particular with respect to the wiper arm. The wiper arm adapter preferably has a bearing unit which is provided to support the wiper blade adapter pivotably with respect to the wiper arm adapter. The bearing unit of the wiper arm adapter is preferably designed as a side-lock adapter. The bearing unit preferably comprises a pin element. The pin element is preferably provided to form a mechanical coupling, in particular to form a pivotable mounting, of the wiper blade adapter on the wiper arm adapter. The pin element preferably defines the wiper blade adapter pivot axis. The wiper blade adapter pivot axis is particularly preferably designed as a longitudinal axis of the pin element. The wiper blade adapter pivot axis is preferably oriented at least substantially perpendicularly to the longitudinal axis of the wiper arm adapter, in particular of the wiper arm rod. The expression "at least substantially perpendicularly" is preferably intended to define an orientation of a direction relative to a reference direction, wherein the direction and the reference direction, in particular as viewed in a plane of projection, enclose an angle of 90°, and the angle has a maximum deviation of in particular less than 20°, advantageously less than 15° and particularly advantageously of less than 10°. The longitudinal axis of the pin element is preferably oriented at least substantially perpendicularly to the longitudinal axis of the wiper arm adapter. The wiper blade adapter pivot axis is preferably oriented parallel to a transverse axis of the wiper arm adapter. The bearing unit preferably comprises a retaining bracket. The retaining bracket is preferably provided to secure the wiper blade adapter, in a fully mounted state of the wiper device on the wiper arm adapter, in a direction parallel to the wiper blade adapter pivot axis. A longitudinal axis of the retaining bracket is preferably oriented at least substantially parallel to the wiper blade adapter pivot axis. The wiper blade adapter preferably has at least one mechanical connecting element for producing a connection to the wiper arm adapter, in particular to the pin element of the wiper arm adapter. The mechanical connecting element of the wiper blade adapter is preferably provided to receive the pin element of the wiper arm adapter. The at least one mechanical connecting element is preferably provided to pivotably mount the pin element. The at least one mechanical connecting element preferably has at least one recess for receiving the pin element. The at least one recess preferably at least mostly forms the at least one mechanical connecting element. The wiper blade adapter pivot axis preferably runs, in particular centrally, through the at least one recess of the mechanical connecting element. The wiper blade adapter pivot axis is preferably oriented parallel to a transverse axis of the cover unit.

The wiper device preferably comprises at least one fluidic coupling element to produce a fluidic connection to at least one fluidic connecting element of the wiper blade adapter. The at least one fluidic coupling element is preferably mounted, in particular in a floating manner, on the wiper arm adapter. The at least one fluidic coupling element is preferably formed separately from the cover unit. The cover unit and the at least one fluidic coupling element are preferably movable independently of each other.

The wiper device preferably comprises at least one electrical connecting element which is mounted on the wiper arm adapter so as to be pivotable about the wiper blade adapter pivot axis. The wiper device preferably comprises at least one electrical coupling element for the electrical connection to the electrical connecting element. The electrical coupling element is preferably provided to be coupled fixedly to the wiper blade adapter.

The cover unit preferably has a cap element. The cap element is preferably provided to at least partially, preferably at least largely, cover at least the wiper blade adapter. The cap element is preferably provided to at least partially, preferably at least largely, cover at least the wiper arm adapter. The cap element is preferably provided to completely cover at least the bearing unit of the wiper arm adapter. The cap element is preferably provided to completely cover at least the at least one fluidic coupling element and the at least one fluidic connecting element. The cap element is preferably provided to completely cover at least the at least one electrical coupling element and the at least one electrical connecting element. The cap element is preferably formed by a shell-like cover cap. The cover unit, in particular the cap element, is preferably connected captively to the wiper arm, in particular to the wiper arm adapter. The cover unit preferably comprises a pivot axis via which the cap element is mounted pivotably. The cover unit is preferably pivotable via the pivot axis between the closed position and the open position. The pivot axis of the cover unit is preferably oriented parallel to the wiper blade adapter pivot axis. The pivot axis of the cover unit is preferably arranged spaced apart from the wiper blade adapter pivot axis. The pivot axis of the cover unit and the wiper blade adapter pivot axis are preferably two different axes. The pivot axis of the cover unit is preferably arranged between the wiper blade adapter pivot axis and a vehicle-side attachment of the wiper arm.

The cover unit preferably comprises at least one gripping structure. The gripping structure is preferably provided to provide grippiness for a manual adjustment of the cover unit. The at least one gripping structure is preferably arranged in a lateral region of the cap element. The cap element preferably forms the at least one gripping structure in at least one partial region of the cap element.

The cover unit preferably has the closed position and the open position. A "closed position" is intended to be understood as meaning preferably a position of the cover unit, in particular of the cap element, in which the cover unit, in particular the cap element, in particular at least partially, preferably at least largely and particularly preferably completely conceals the wiper blade adapter, the wiper arm adapter, the bearing unit, the at least one fluidic coupling element, the at least one fluidic connecting element, the at least one electrical coupling element and/or the at least one electrical connecting element in relation to the environment. An "environment" is intended to be understood as meaning preferably a space outside a volume spanned by the cover unit, in particular the cap element. The cover unit, in the closed position, preferably has a locked position and an unlocked position. In the closed position the cover unit, in particular the cap element, is particularly preferably displaceable translationally along a displacement axis between the locked position and the unlocked position. "Displaceable" is intended to be understood as meaning preferably displaceable manually, in particular by hand. The cover unit is preferably provided to be displaced manually, in particular by an operator, between the locked position and the unlocked position. In the unlocked position, the cap element can preferably be transferred from the closed position into the open position. In the locked position, the cap element preferably cannot be transferred from the closed position into the open position. The cap element, in particular in the unlocked position, can preferably be transferred from the open position into the closed position. An "open position" is intended to be understood as meaning preferably a position of the cover unit, in particular of the cap element, in which the cover unit, in particular the cap element, has been pivoted from the closed position, wherein the wiper blade adapter, the wiper arm adapter, the bearing unit, the at least one fluidic coupling element, the at least one fluidic connecting element, the at least one electrical connecting element and/or the at least one electrical coupling element are exposed to the environment. The cover unit, in particular the cap element, preferably, in particular at least largely, does not conceal the wiper blade adapter, the wiper arm adapter, the bearing unit, the at least one fluidic coupling element, the at least one fluidic connecting element, the at least one electrical connecting element and/or the at least one electrical coupling element in the open position. In the open position, the cap element is preferably pivoted in particular at least by 30°, preferably by at least 45°, particularly preferably by at least 60° and very particularly preferably by at least 90° in relation to the closed position.

Furthermore, it is proposed that the pivot axis is oriented at least substantially perpendicularly to the displacement axis, wherein the cover unit is displaceable along the displacement axis between the locked position and the unlocked position. By means of this configuration, an advantageously secure connection of the cover unit to the wiper arm can be achieved. As a result, an unintended deflection of the cover unit out of the closed position into the open position can be advantageously avoided. The pivot axis preferably intersects the cap element. The displacement axis is preferably oriented at least substantially parallel to the longitudinal axis of the wiper arm, in particular of the wiper arm adapter. The displacement axis is preferably oriented at least substantially parallel to a longitudinal axis of the cover unit, in particular of the cap element.

Furthermore, it is proposed that the cover unit has at least one pivoting bearing element which engages in a recess of the wiper arm adapter and is mounted in the recess so as to be displaceable translationally during a displacement of the cover unit between the unlocked position and the locked position. By means of this configuration, an advantageously captively secure attachment of the cover unit to the wiper arm can be made possible. Furthermore, an advantageously pivotable mounting of the cover unit can be achieved by this configuration. The at least one pivoting bearing element is preferably arranged on an inner side of the cover unit, in particular of the cap element, facing the wiper arm adapter. The at least one pivoting bearing element is preferably arranged on the cap element. The at least one pivoting bearing element is preferably formed integrally with the cap element. The at least one pivoting bearing element is preferably designed as a pin. The at least one pivoting bearing element is preferably bolt-shaped and/or peg-shaped. The at least one pivoting bearing element is preferably mounted so as to be displaceable translationally along the displacement axis. The at least one pivoting bearing element is preferably not pivotable during a displacement of the cover unit, in particular of the cap element, between the locked and the unlocked position. The at least one pivoting bearing element is preferably guided in the recess. The at least one pivoting bearing element is preferably mounted translationally along the displacement axis and rotationally about the pivot axis in the recess, in particular depending on the locked position and the unlocked position. The pivot axis preferably intersects the at least one pivoting bearing element. The at least one pivoting bearing element preferably defines the pivot axis.

In addition, it is proposed that the recess is in the form of an elongated hole. By means of this configuration, an advantageously defined translational guiding of the at least one pivoting bearing element can be achieved. A longitudinal axis of the elongated hole preferably extends parallel to the displacement axis.

Furthermore, it is proposed that the cover unit has at least one latching element which is arranged on an inner side of the cover unit that faces the wiper arm adapter, and which, in the closed position, is arranged in a latching formation of the wiper arm adapter and which is provided to retain the cover unit in the closed position, in particular in the unlocked position. By means of this configuration, an automatic and/or unintended adjustment of the cover unit from the closed position into the open position can be advantageously avoided. An advantageously reliable operation of the wiper device can thereby be made possible. Furthermore, a secure positioning in the closed position can be achieved by this configuration. An operator of the cover unit can advantageously recognize here whether the cover unit is in the closed position, in order to transfer it from the unlocked position into the locked position. As a result, damage to the cover unit by a movement in an intermediate position can be advantageously avoided. The at least one latching element is preferably designed as an elevation. The at least one latching element is preferably at least partially designed as a spherical section, as a cone or as a pyramid. The at least one latching element is preferably arranged on the cap element. The at least one latching element is preferably formed integrally with the cap element. The at least one latching element is preferably arranged in the latching formation in the closed position. The latching formation is preferably designed as an impression in the wiper arm adapter. The latching formation preferably provides a movement clearance, in which the at least one latching element is movable along the displacement axis. During a pivoting of the cover unit, in particular of the cap element, the at least one latching element is preferably provided to be moved out of the latching formation, in particular by means of a manual action of force during the pivoting. The at least one latching element is preferably arranged outside the latching formation in the open position.

Furthermore, it is proposed that the cover unit comprises a hook element which, in the closed position, engages in a further recess of the wiper arm adapter. By means of this configuration, an advantageous rotational securing of the cover unit can be provided. As a result, an unintended deflection of the cover unit from the closed position into the open position can be advantageously avoided. The hook element is preferably provided to secure the cover unit, in particular the cap element, in the locked position against pivoting out of the closed position. The hook element is preferably provided to prevent pivoting of the cap element in the locked position. The hook element is preferably arranged on the cap element. The hook element is preferably formed integrally with the cap element. In the locked position, the cap element is preferably fastened to the wiper arm adapter, in particular via the hook element. The further recess is preferably designed as a closed profile. The further recess is preferably rectangular or in the form of an elongated hole. The further recess preferably provides a movement clearance, in which the hook element is movable along the displacement axis. An imaginary axis parallel to the wiper blade adapter pivot axis preferably intersects the further recess and the at least one fluidic coupling element. In the unlocked position, the hook element is particularly preferably arranged in the further recess, wherein the hook element is pivotable without making contact with the wiper arm adapter. In the locked position, the hook element is particularly preferably arranged in the further recess, wherein the hook element is coupled in a form-fitting manner to the wiper arm adapter in a pivoting direction of the cover unit from the closed position into the open position. The hook element preferably forms an extension which reaches behind the wiper arm adapter in the locked position. The hook element is particularly preferably at least L-shaped. In the open position, the hook element is preferably arranged outside the further recess.

In addition, it is proposed that the hook element forms a latching element which, in the locked position of the cover unit, is provided to engage in a latching recess of the wiper arm adapter so as to translationally secure the cover unit. By means of this configuration, an advantageous translational securing of the cover unit can be provided. Furthermore, an advantageously simple locking of the cover unit in the locked position can be achieved by this configuration. An unintended displacement of the cover unit can thereby be advantageously avoided. The hook element is preferably provided to latch the cover unit, in particular the cap element, in the locked position. The hook element is particularly preferably J-shaped. The latching element is preferably arranged on the extension. The latching recess is preferably in the form of a through hole. The latching recess is preferably in the form of a closed profile. The latching recess is preferably rectangular. Preferably, an imaginary axis at least substantially parallel to the longitudinal axis of the wiper arm adapter intersects the further recess and the latching recess. The further recess and the latching recess are preferably separated from each other by a web. The latching recess is preferably provided to provide a space for the latching element to latch into. In the locked position, the latching element preferably engages in the latching recess of the wiper arm adapter. The latching element is preferably provided to be moved out of the latching recess during a displacement of the cover unit between the locked position and the unlocked position. The latching element is preferably provided to be moved into the latching recess during a displacement of the cover unit between the unlocked position and the locked position.

Furthermore, it is proposed that the cover unit has at least one spacer element which is arranged on an inner side of the cover unit facing the wiper arm adapter and makes contact with the wiper arm adapter at least in the locked position. The effect which can advantageously be achieved by this configuration is that the hook element, in particular the latching element, is not automatically released from the locked position. Furthermore, by means of this configuration, a contact pressure against the cover unit, which contact pressure is generated by a head wind, can be transmitted in an advantageously dimensionally stable manner to the wiper arm adapter. The spacer element is preferably arranged on the cap element. The spacer element is preferably formed integrally with the cap element. The spacer element is preferably provided to ensure a defined position of the hook element, in particular of the latching element, with respect to the wiper arm adapter. During a translational displacement of the cover unit between the unlocked position and the locked position, the spacer element is preferably mounted in a sliding manner with respect to the wiper arm adapter. In the closed position, the spacer element is preferably arranged between the wiper blade adapter pivot axis and the retaining bracket. In the closed position, the spacer element is preferably arranged between the wiper blade adapter pivot axis and the hook element.

Furthermore, a method for the installation of the wiper device is proposed, wherein the cover unit, in at least one method step, is unlocked and/or locked by means of a translational movement between the unlocked position of the cover unit and the locked position of the cover unit and, in at least one further method step, is pivoted in relation to the wiper arm adapter between the closed position of the cover unit and the open position of the cover unit. By means of this configuration, an advantageously simple and reliable handling of the cover unit can be achieved.

The wiper device according to the invention is not intended to be limited here to the above-described use and embodiment. In particular, the wiper device according to the invention, in order to perform a function described herein, may have a number of individual elements, components and units, and also method steps, which differs from the number mentioned herein. In addition, in the ranges of values indicated in this disclosure, values lying within the limits mentioned are also intended to be considered to be disclosed and usable as desired.

BRIEF DESCRIPTION OF THE DRAWINGS

Further advantages emerge from the description below of the drawings. The drawings illustrate an exemplary embodiment of the invention. The drawings, the description and the claims contain numerous features in combination. A person skilled in the art will expediently also consider the features individually and combine them to form meaningful further combinations.

In the drawings.

DETAILED DESCRIPTION

Figure 1:
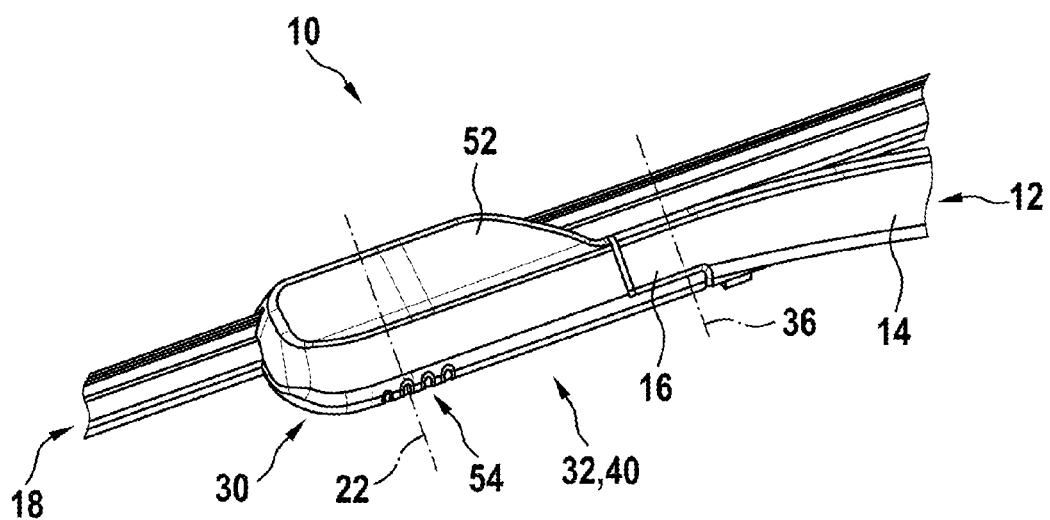
FIG. 1 shows a perspective view of a wiper device according to the invention with a cover unit in a closed position and in a locked position in a schematic illustration.
Figure 2:
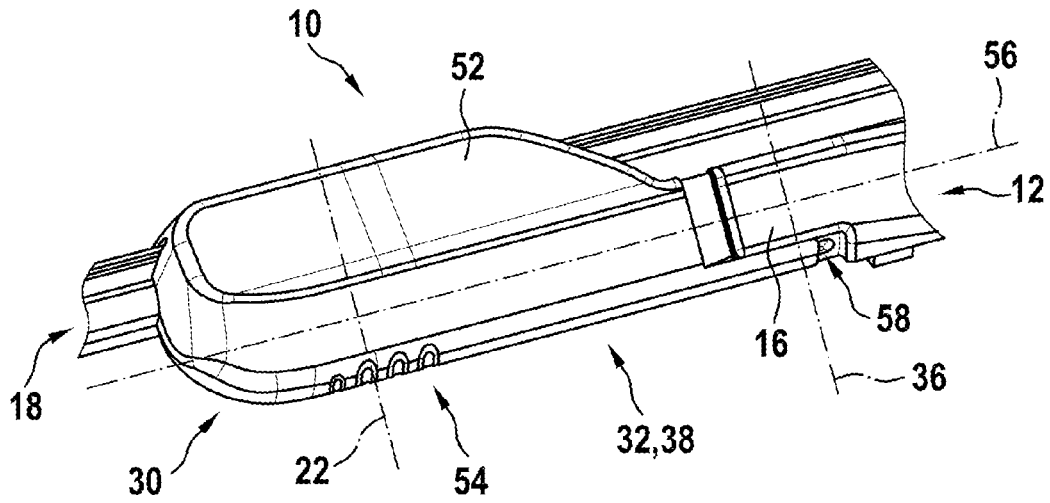
FIG. 2 shows a perspective view of the wiper device according to the invention with the cover unit in the closed and in an unlocked position in a schematic illustration.
Figure 3:
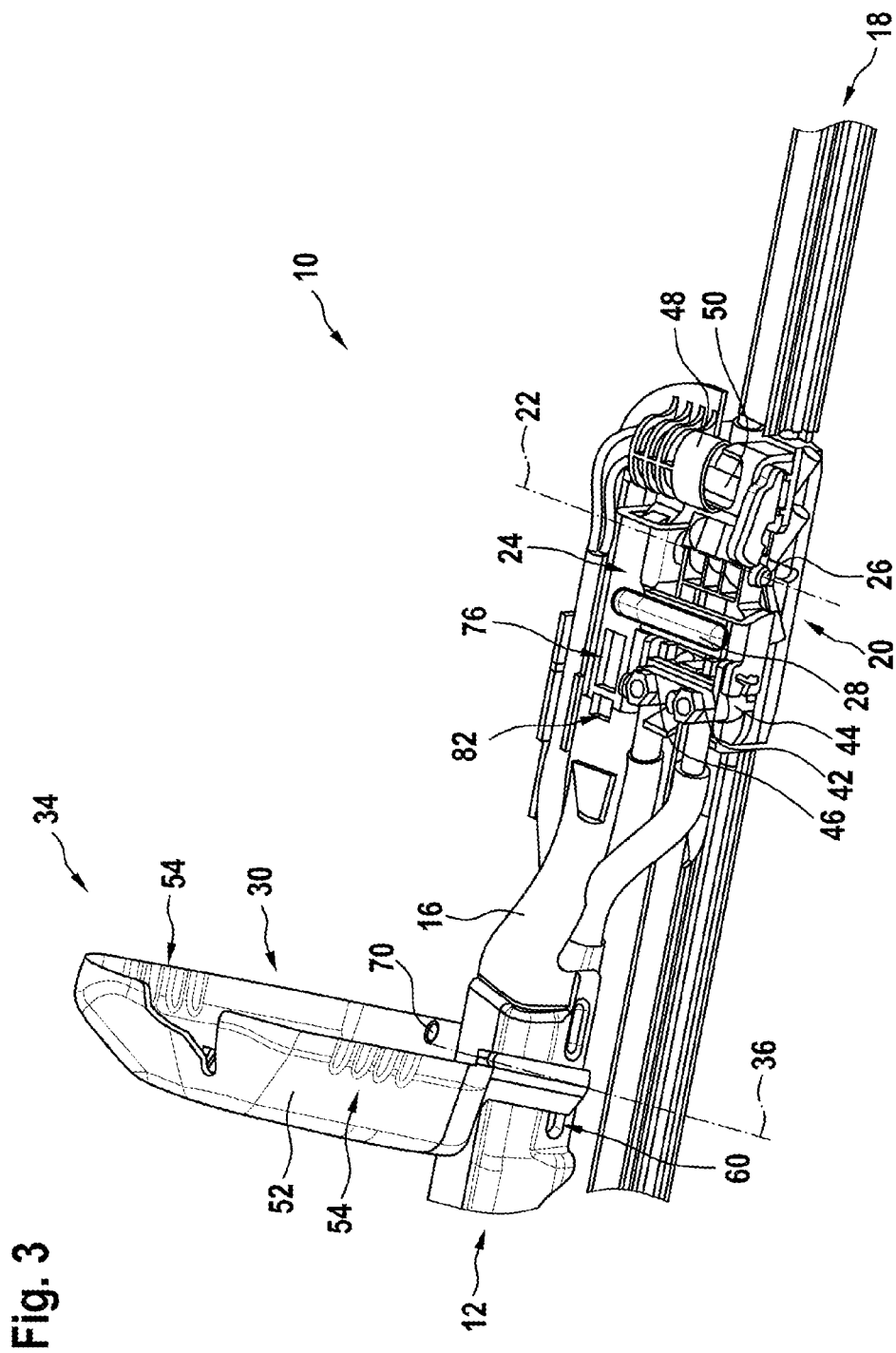
FIG. 3 shows a perspective view of the wiper device according to the invention with the cover unit in an open position in a schematic illustration.
Figure 4:
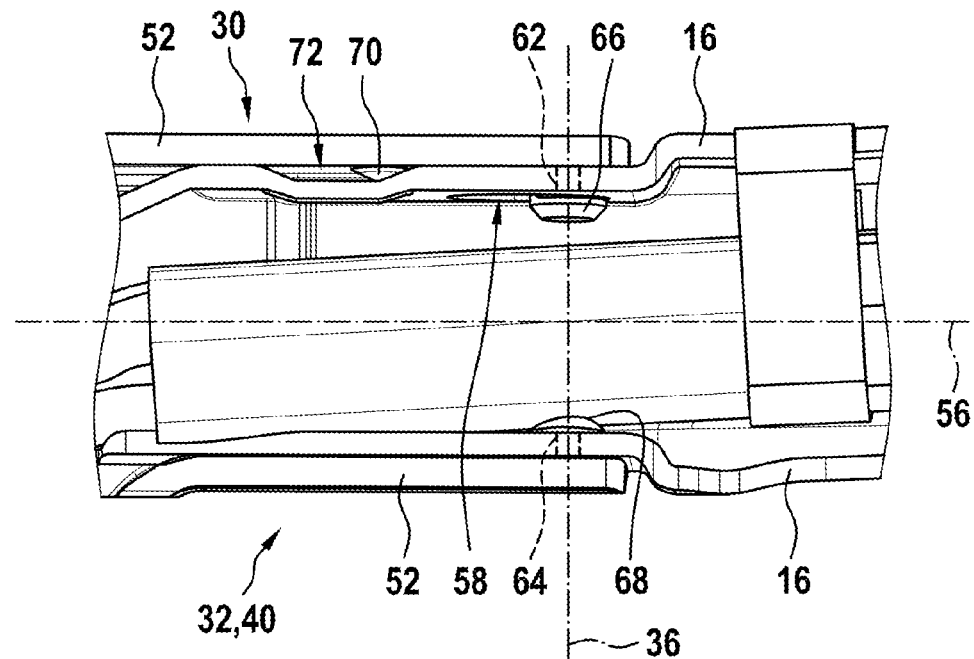
FIG. 4 shows a bottom view of the cover unit and of a wiper arm of the wiper device according to the invention in the locked position in a schematic illustration.
Figure 5:
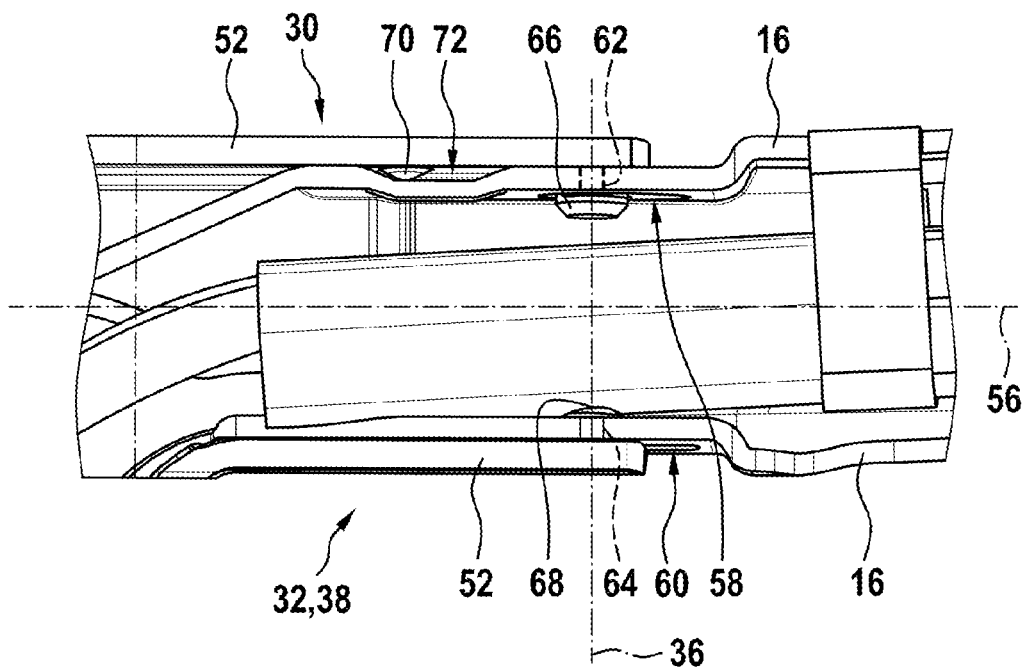
FIG. 5 shows a bottom view of the cover unit and of the wiper arm in the unlocked position in a schematic illustration.
Figure 6:
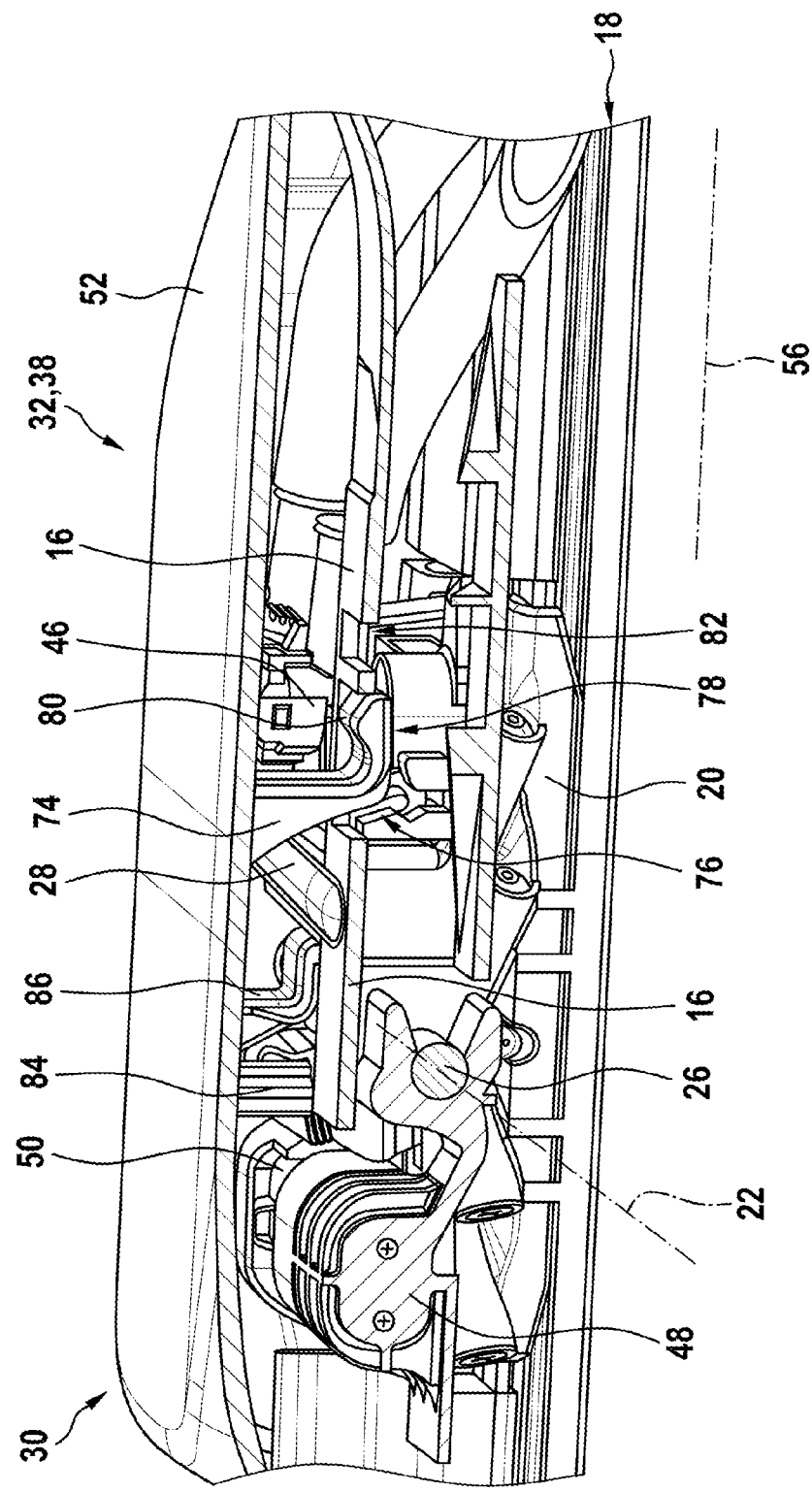
FIG. 6 shows a sectional view of the wiper device according to the invention in the closed position and in the unlocked position in a schematic illustration.
Figure 7:
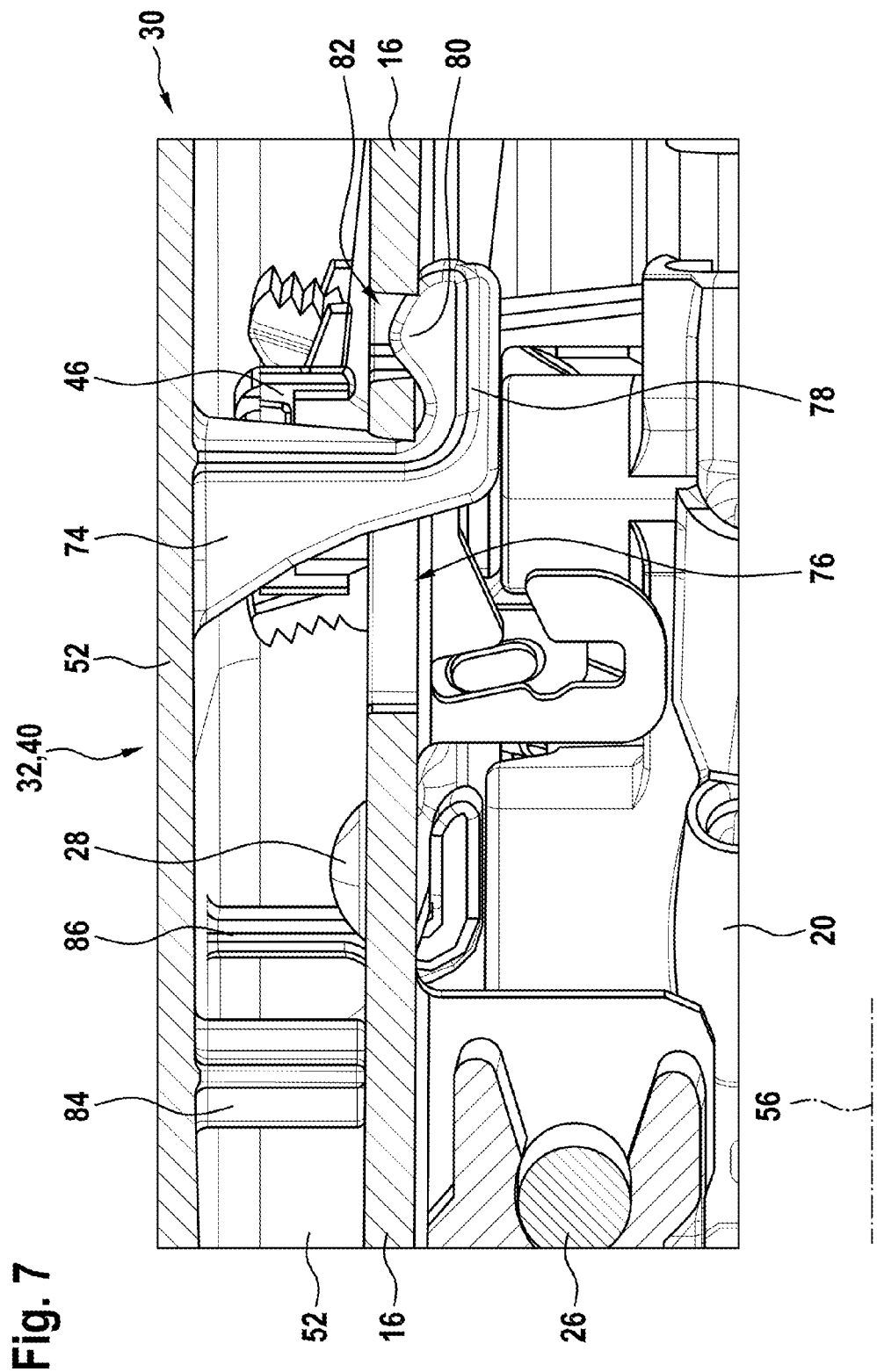
FIG. 7 shows a sectional view of the wiper device according to the invention in the closed position and in the locked position in a schematic illustration.

FIGS. 1 to 7 show a wiper device 10. The wiper device 10 is provided for use on a vehicle. The wiper device 10, in particular as part of a window wiper device, is provided for cleaning a surface, preferably a window on a vehicle. In order to clean a vehicle window, the wiper device 10 is coupled to a vehicle. In principle, the wiper device 10 may also form the entire window wiper device.

The wiper device 10 comprises a wiper arm 12. The wiper device 10 comprises a wiper arm rod 14. The wiper device 10 comprises a wiper arm adapter 16. The wiper arm adapter 16 has a longitudinal axis which is oriented at least substantially parallel to a longitudinal axis of the wiper arm rod 14. The wiper arm adapter 16 is connected captively to the wiper arm rod 14. The wiper arm 12 comprises the wiper arm rod 14. The wiper arm 12 comprises the wiper arm adapter 16.

The wiper device 10 comprises a wiper blade 18. The wiper device 10 comprises a wiper blade adapter 20. The wiper blade adapter 20, in particular the wiper blade 18, is mounted on the wiper arm adapter 16 so as to be pivotable about a wiper blade adapter pivot axis 22, in particular with respect to the wiper arm 12. The wiper blade 18 comprises the wiper blade adapter 20.

The wiper arm adapter 16 comprises a bearing unit 24 which is provided to mount the wiper blade adapter 20 on the wiper arm adapter 16 so as to be pivotable about the wiper blade adapter pivot axis 22. The bearing unit 24 of the wiper arm adapter 16 is designed as a side-lock adapter. The wiper arm adapter 16 has a pin element 26. The pin element 26 is surrounded by the bearing unit 24. The pin element 26 is provided for a mechanical coupling, in particular for a pivotable mounting, of the wiper blade adapter 20 on the wiper arm adapter 16. The pin element 26 defines the wiper blade adapter pivot axis 22. The wiper blade adapter pivot axis 22 is designed as a longitudinal axis of the pin element 26. The wiper blade adapter pivot axis 22 is oriented at least substantially perpendicularly to the longitudinal axis of the wiper arm adapter 16, in particular of the wiper arm rod 14. The longitudinal axis of the pin element 26 is oriented at least substantially perpendicularly to the longitudinal axis of the wiper arm adapter 16. The longitudinal axis of the pin element 26 is oriented substantially parallel to a transverse axis of the wiper arm adapter 16. The wiper blade adapter pivot axis 22 is oriented parallel to a transverse axis of the wiper arm adapter 16. The wiper arm adapter 16 has a retaining bracket 28. The retaining bracket 28 is surrounded by the bearing unit 24 of the wiper arm adapter 16. A longitudinal axis of the retaining bracket 28 is oriented at least substantially parallel to the wiper blade adapter pivot axis 22. The wiper blade adapter 20 has at least one mechanical connecting element, not illustrated specifically, to produce a connection to the wiper arm adapter 16, in particular to the pin element 26. The mechanical connecting element of the wiper blade adapter 20 is provided to receive the pin element 26 of the wiper arm adapter 16. The at least one mechanical connecting element is provided to pivotably mount the pin element 26.

The wiper device 10 comprises a cover unit 30 which is mounted on the wiper arm adapter 16 so as to be pivotable about a pivot axis 36 between an open position 34 and a closed position 32 and which, in the closed position 32, at least partially covers the wiper arm adapter 16 in relation to an environment. The cover unit 30 has the closed position 32 and the open position 34. The cover unit 30, in the closed position 32, is displaceable translationally between an unlocked position 38 and a locked position 40.

The wiper device 10 comprises a fluidic coupling element 42 to produce a fluidic connection to a fluidic connecting element 44 of the wiper blade adapter 20. The fluidic coupling element 42 is mounted, in particular in a floating manner, on the wiper arm adapter 16. The fluidic coupling element 42 is formed separately from the cover unit 30. The cover unit 30 and the fluidic coupling element 42 are movable independently of each other. The wiper device 10 comprises a further fluidic coupling element 46 which is formed substantially identically to the fluidic coupling element 42. The fluidic coupling element 42 and the further fluidic coupling element 46 are formed integrally.

The wiper device 10 comprises an electrical connecting element 48 which is mounted on the wiper arm adapter 16 so as to be pivotable about the wiper blade adapter pivot axis 22. The electrical connecting element 48 is formed separately from the cover unit 30. The wiper device 10 comprises an electrical coupling element 50 for the electrical connection to the electrical connecting element 48. The electrical coupling element 50 is connected captively to the wiper blade adapter 20 and is provided to be coupled pivotably to the wiper arm adapter 16 via the electrical connecting element 48. The electrical coupling element 50 is formed separately from the cover unit 30.

The cover unit 30 has a cap element 52. The cap element 52 is formed by a shell-like cover cap. In the present case, the cap element 52 is formed from a plastic. In the closed position 32, the cap element 52 is displaceable translationally between the unlocked position 38 and the locked position 40.

The cover unit 30 comprises a gripping structure 54. The gripping structure 54 is provided to provide grippiness for a manual adjustment, in particular translational displacement, of the cover unit 30. The gripping structure 54 is arranged in a lateral region of the cap element 52. The cap element 52 forms the gripping structure 54 in a plurality of partial regions of the cap element 52. The cover unit 30 is provided to be displaced between the locked position 40 and the unlocked position 38 by means of one hand and/or by means of at least two fingers, in particular by means of the gripping structure 54.

The cover unit 30, in particular the cap element 52, is connected captively to the wiper arm 12, in particular to the wiper arm adapter 16. The cover unit 30 comprises the pivot axis 36. The cap element 52 is mounted pivotably on the wiper arm 12, in particular on the wiper arm adapter 16, via the pivot axis 36. The cover unit 30 is pivotable between the closed position 32 and the open position 34 via the pivot axis 36. The pivot axis 36 of the cover unit 30 is oriented parallel to the wiper blade adapter pivot axis 22. The pivot axis 36 of the cover unit 30 is arranged spaced apart from the wiper blade adapter pivot axis 22. The pivot axis 36 of the cover unit 30 and the wiper blade adapter pivot axis 22 are two different axes. The wiper blade adapter pivot axis 22 is oriented parallel to a transverse axis of the cover unit 30, in particular of the cap element 52. The pivot axis 36 of the cover unit 30 is arranged between the wiper blade adapter pivot axis 22 and a vehicle-side attachment of the wiper arm 12.

The cap element 52 is provided to at least partially, preferably at least largely, cover at least the wiper blade adapter 20. The cap element 52 is provided to at least partially, preferably at least largely, cover at least the wiper arm adapter 16. The cap element 52 is provided to completely cover at least the bearing unit 24 of the wiper arm adapter 16. The cap element 52 is provided to completely cover at least the at least one fluidic coupling element 42, 46 and the at least one fluidic connecting element 44. The cap element 52 is provided to completely cover at least the electrical coupling element 50 and the electrical connecting element 48.

In the closed position 32 the cap element 52 at least largely conceals the wiper blade adapter 20, the wiper arm adapter 16, the bearing unit 24, the at least one fluidic coupling element 42, 46, the at least one fluidic connecting element 44, the electrical coupling element 50 and the electrical connecting element 48 in relation to the environment. In the closed position 32, the cover unit 30 has the locked position 40 and the unlocked position 38. In the closed position 32, the cover unit 30 is either in the locked position 40 or in the unlocked position 38. In the closed position 32, the cover unit 30, in particular the cap element 52, is displaceable translationally along a displacement axis 56 between the locked position 40 and the unlocked position 38. The pivot axis 36 is oriented at least substantially perpendicularly to the displacement axis 56, wherein the cover unit 30 is displaceable along the displacement axis 56 between the locked position 40 and the unlocked position 38. The pivot axis 36 intersects the cap element 52. The displacement axis 56 is oriented at least substantially parallel to the longitudinal axis of the wiper arm 12, in particular of the wiper arm adapter 16. The displacement axis 56 is oriented at least substantially parallel to a longitudinal axis of the cover unit 30, in particular of the cap element 52. The cover unit 30, in particular the cap element 52, is in the closed position 32 both in the locked position 40 and in the unlocked position 38. In the unlocked position 38, the cap element 52 can be transferred from the closed position 32 to the open position 34. In the locked position 40, the cap element 52 cannot be transferred from the closed position 32 into the open position 34. In the unlocked position 38, the cap element 52 can be transferred from the open position 34 into the closed position 32. In the locked position 40, the cap element 52 cannot be transferred from the open position 34 into the closed position 32. In the open position 34, the cap element 52 has been pivoted from the closed position 32, wherein the wiper blade adapter 20, the wiper arm adapter 16, the bearing unit 24, the at least one fluidic coupling element 42, 46, the at least one fluidic connecting element 44, the electrical connecting element 48 and the electrical coupling element 50 are exposed to the environment. The cover unit 30, in particular the cap element 52, at least largely does not conceal the wiper blade adapter 20, the wiper arm adapter 16, the bearing unit 24, the at least one fluidic coupling element 42, 46, the at least one fluidic connecting element 44, the electrical connecting element 48 and the electrical coupling element 50 in the open position 34.

In the present case, the wiper arm adapter 16 has two recesses 58, 60 which are provided for coupling to the cover unit 30, in particular for mounting the cap element 52. The recesses 58, 60 are in each case in the form of an elongated hole. A longitudinal axis of the elongated holes extends in each case parallel to the displacement axis 56.

In the present case, the cover unit 30 has two pivoting bearing elements 62, 64. The pivoting bearing elements 62, 64 in each case engage in one of the recesses 58, 60 of the wiper arm adapter 16. The pivoting bearing elements 62, 64 are in each case arranged on an inner side of the cover unit 30, in particular of the cap element 52, which faces the wiper arm adapter 16. The pivoting bearing elements 62, 64 are arranged opposite each other. The pivoting bearing elements 62, 64 are arranged on the cap element 52. The pivoting bearing elements 62, 64 are formed integrally with the cap element 52. The pivoting bearing elements 62, 64 are each in the form of a pin. The pivoting bearing elements 62, 64 are each bolt-shaped and/or peg-shaped. In the present case, the pivoting bearing elements 62, 64 each form a form-fitting element 66, 68 in each case at an end of the pivoting bearing elements 62, 64 that faces away from the cap element 52, said form-fitting elements 66, 68 being provided to produce an at least partial form-fitting securing of the pivoting bearing elements 62, 64 in the recesses 58, 60.

The pivoting bearing elements 62, 64 are mounted so as to be displaceable translationally along the displacement axis 56. The pivoting bearing elements 62, 64 are each mounted in a sliding manner in one of the recesses 58, 60. During a displacement of the cover unit 30 between the unlocked position 38 and the locked position 40, the pivoting bearing elements 62, 64 are each mounted so as to be displaceable translationally in in each case one of the recesses 58, 60. The pivoting bearing elements 62, 64 are in each case mounted in one of the recesses 58, 60 translationally along the displacement axis 56 and rotationally about the pivot axis 36, in particular depending on the locked position 40 and the unlocked position 38. The pivot axis 36 intersects the pivoting bearing elements 62, 64. The pivoting bearing elements 62, 64 define the pivot axis 36. The pivoting bearing elements 62, 64 are not pivotable during a displacement of the cover unit 30, in particular of the cap element 52, between the locked position 40 and the unlocked position 38. The pivoting bearing elements 62, 64 are each guided in the recesses 58, 60.

The cover unit 30 has a latching element 70 which is arranged on an inner side of the cover unit 30 that faces the wiper arm adapter 16, and which, in the closed position 32, is arranged in a latching formation 72 of the wiper arm adapter 16 and which is provided to retain the cover unit 30 in the closed position 32, in particular in the unlocked position 38. The latching element 70 is in the form of an elevation. In the present case, the latching element 70 is in the form of a cone. The latching element 70 is arranged on the cap element 52. The latching element 70 is formed integrally with the cap element 52. In the closed position 32, the latching element 70 is arranged in the latching formation 72. The latching formation 72 is in the form of an impression in the wiper arm adapter 16. In the present case, the latching formation 72 forms a depression. The latching formation 72 provides a movement clearance in which the latching element 70 is movable along the displacement axis 56. During a pivoting of the cover unit 30, in particular of the cap element 52, the latching element 70 is provided to be moved out of the latching formation 72, in particular by means of a manual action of force during the pivoting. In the open position 34, the latching element 70 is arranged outside the latching formation 72.

The cover unit 30 comprises a hook element 74. In the closed position 32, the hook element 74 engages in a further recess 76 of the wiper arm adapter 16. The hook element 74 is provided to secure the cover unit 30, in particular the cap element 52, in the locked position 40 against pivoting out of the closed position 32. The hook element 74 is provided to prevent a pivoting of the cap element 52 in the locked position 40. The hook element 74 is arranged on the cap element 52. The hook element 74 is formed integrally with the cap element 52. In the locked position 40, the cap element 52 is fastened to the wiper arm adapter 16, in particular via the hook element 74. The further recess 76 is in the form of an elongated hole. The further recess 76 is in the form of a closed profile. In the present case, the further recess 76 is shaped rectangularly. The further recess 76 provides a movement clearance in which the hook element 74 is movable along the displacement axis 56. An imaginary axis parallel to the wiper blade adapter pivot axis 22 intersects the further recess 76 and the fluidic coupling element 42. In the unlocked position 38, the hook element 74 is arranged in the further recess 76, wherein the hook element 74 is pivotable with respect to the wiper arm adapter 16 without making contact. In the locked position 40, the hook element 74 is arranged in the further recess 76, wherein the hook element 74 is coupled in a form-fitting manner to the wiper arm adapter 16 in a pivoting direction of the cover unit 30 from the closed position 32 into the open position 34. The hook element 74 forms an extension 78 which reaches behind the wiper arm adapter 16 in the locked position 40. In the locked position 40, the hook element 74 makes contact with the wiper arm adapter 16. In the open position 34, the hook element 74 is arranged outside the further recess 76. The hook element 74 is at least L-shaped. The hook element 74 forms a latching element 80. In the locked position 40 of the cover unit 30, the latching element 80 is provided to engage in a latching recess 82 of the wiper arm adapter 16 for translationally securing the cover unit 30. The hook element 74 is provided to latch the cover unit 30, in particular the cap element 52, in the locked position 40. In the present case, the hook element 74 is J-shaped. The latching element 80 is arranged on the extension 78. The latching recess 82 is in the form of a through hole. The latching recess 82 is in the form of a closed profile. The latching recess 82 is shaped rectangularly. An imaginary axis at least substantially parallel to the longitudinal axis of the wiper arm adapter 16 intersects the further recess 76 and the latching recess 82. An imaginary axis parallel to the displacement axis 56 intersects the further recess 76 and the latching recess 82. The further recess 76 and the latching recess 82 are separated from each other by a web. The latching recess 82 is provided to provide a space in which the latching element 80 latches. In the locked position 40, the latching element 80 engages in the latching recess 82 of the wiper arm adapter 16. The latching element 80 is provided to be moved out of the latching recess 82 during a displacement of the cover unit 30 from the locked position 40 into the unlocked position 38. The latching element 80 is provided to be moved into the latching recess 82 during a displacement of the cover unit 30 from the unlocked position 38 into the locked position 40.

The cover unit 30 has a spacer element 84. The spacer element 84 is arranged on an inner side of the cover unit 30 that faces the wiper arm adapter 16. The spacer element 84 makes contact with the wiper arm adapter 16 at least in the locked position 40. The spacer element 84 is arranged on the cap element 52. The spacer element 84 is formed integrally with the cap element 52. The spacer element 84 is provided to ensure a defined distance between the cap element 52 and the wiper arm adapter 16 in a region of the bearing unit 24. The spacer element 84 is provided to ensure a defined position of the hook element 74, in particular of the latching element 80, with respect to the wiper arm adapter 16. During a translational displacement of the cover unit 30 between the unlocked position 38 and the locked position 40, the spacer element 84 is mounted in a sliding manner with respect to the wiper arm adapter 16. In the closed position 32, the spacer element 84 is arranged between the wiper blade adapter pivot axis 22 and the retaining bracket 28. In the closed position 32, the spacer element 84 is arranged between the wiper blade adapter pivot axis 22 and the hook element 74.

The cover unit 30 comprises a further hook element 86. In the closed position 32, the further hook element 86 is at least partially arranged between the wiper blade adapter pivot axis 22 and the retaining bracket 28. The further hook element 86 is provided to secure the cover unit 30, in particular the cap element 52, in the locked position 40 from pivoting out of the closed position 32 in the locked position 40. The further hook element 86 is provided to prevent a pivoting of the cap element 52 in the locked position 40. The further hook element 86 is arranged on the cap element 52. The further hook element 86 is formed integrally with the cap element 52. The further hook element 86 is L-shaped. In the unlocked position 38, the further hook element 86 is pivotable with respect to the wiper arm adapter 16 without making contact. In the locked position 40, the further hook element 86 makes contact with the retaining bracket 28. In the locked position 40, the further hook element 86 reaches behind the retaining bracket 28, wherein the further hook element 86 is coupled in a form-fitting manner to the wiper arm adapter 16 in the pivoting direction of the cover unit 30 from the closed position 32 into the open position 34. The hook element 74 and the further hook element 86 are arranged offset with respect to each other, as viewed along the displacement axis 56. The hook element 74 and the further hook element 86 are arranged offset with respect to each other, as viewed along the pivot axis 36. The hook element 74 and the further hook element 86 are designed to be simultaneously displaceable translationally along the displacement axis 56 via the cap element 52. The hook element 74 and the further hook element 86 are designed to be pivotable simultaneously about the pivot axis 36 via the cap element 52.

The cover unit 30, in particular by means of a formation of the cap element 52, is provided to exert a downward force on the wiper arm adapter 16, in particular on the wiper blade 18, at high vehicle speeds. An advantageously high wiping quality can thereby be achieved. For this purpose, the cover unit 30 can have a spoiler element which is arranged on an upper side of the cap element 52.

Figure 8:
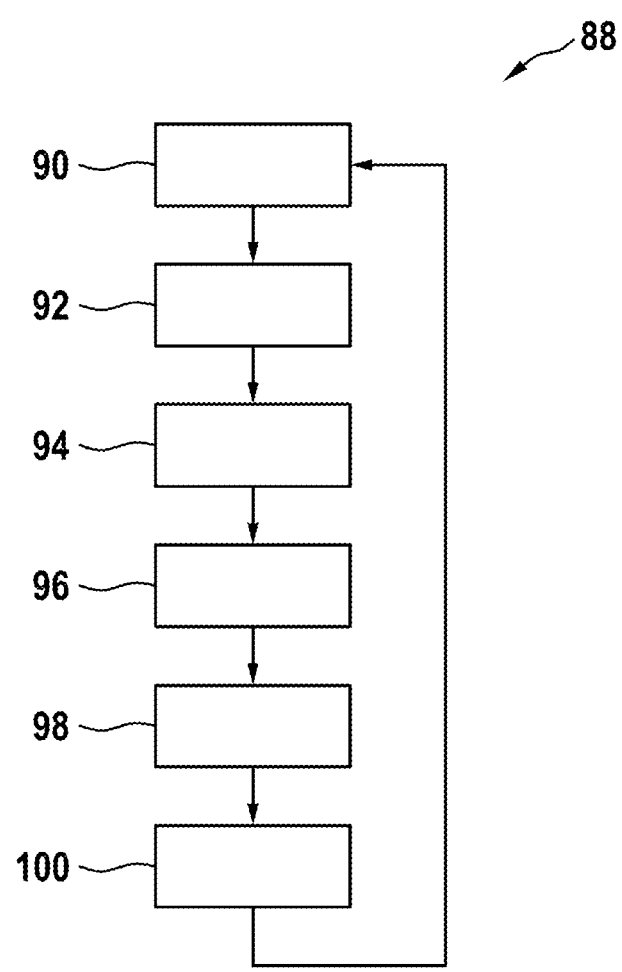
FIG. 8 shows a method according to the invention for the installation of the wiper device according to the invention.

FIG. 8 shows a method 88 for installation of the wiper device 10. The method 88 comprises a plurality of method steps 90, 92, 94, 96, 98, 100.

In a first method step 90 of the method 88, the cap element 52 is transferred translationally from the locked position 40 into the unlocked position 38, in particular by hand, by means of the gripping structure 54. Before the first method step 90, the wiper device 10 is in an operationally prepared state. In the first method step 90, the cover unit 30 is unlocked by means of a translational movement between the locked position 40 of the cover unit 30 and the unlocked position 38 of the cover unit 30. In the first method step 90, the pivoting bearing elements 62, 64 are displaced translationally along the displacement axis 56 in the recesses 58, 60. In the first method step 90, the hook element 74 is displaced translationally along the displacement axis 56. The latching element 80 which is formed by the hook element 74 is decoupled here from the latching recess 82 of the wiper arm adapter 16. In the first method step 90, the further hook element 86 is displaced translationally along the displacement axis 56. The further hook element 86 is decoupled in the process from the retaining bracket 28. In the first method step 90, the cover unit 30 is permanently in the closed position 32. After the first method step 90, the cover unit 30 is in the unlocked position 38.

In a second method step 92 of the method 88, the cover unit 30 is pivoted, in particular by hand, from the closed position 32 into the open position 34. In the second method step 92, the cover unit 30, in particular the cap element 52, is pivoted in relation to the wiper arm adapter 16 between the closed position 32 of the cover unit 30 and the open position 34 of the cover unit 30. In the second method step 92, the cap element 52 is pivoted from the closed position 32 into the open position 34. In the open position 34, the cap element 52 is pivoted in relation to the closed position 32 at least by 45°, preferably by at least 60° and particularly preferably by at least 90°. After the second method step 92, the cover unit 30 is in the open position 34.

In a third method step 94 of the method 88, the wiper blade 18 is decoupled from the wiper arm 12. In the third method step 94, the fluidic coupling element 42 is decoupled from the fluidic connecting element 44. In the process, a latching unit of the fluidic coupling element 42 is actuated. In the third method step 94, the electrical coupling element 50 is decoupled from the electrical connecting element 48. In the third method step 94, the wiper blade adapter 20 is pivoted with respect to the wiper arm adapter 16 via the wiper blade adapter pivot axis 22 in such a manner that the bearing unit 24, in particular the retaining bracket 28, releases the wiper blade 18 for decoupling via the pin element 26. In the third method step 94, the wiper blade adapter 20 is pulled off the pin element 26. During a pivoting of the electrical connecting element 48, the electrical connecting element 48 remains in position with respect to the wiper arm adapter 16.

In a fourth method step 96 of the method 88, a wiper blade, in particular another wiper blade, is coupled to the wiper arm 12. In principle, however, it may also be the same wiper blade, and therefore the description below refers to the previously introduced wiper blade 18 for the sake of simplicity. In the fourth method step 96, the wiper blade adapter 20 is pushed onto the pin element 26. In the process, the electrical coupling element 50 is coupled to the electrical connecting element 48. In the fourth method step 96, the wiper blade adapter 20 is pivoted with respect to the wiper arm adapter 16 via the wiper blade adapter pivot axis 22 in such a manner that the bearing unit 24, in particular the retaining bracket 28, fixes the wiper blade 18 in a direction parallel to the wiper blade adapter pivot axis 22. In the fourth method step 96, the fluidic coupling element 42 is coupled to the fluidic connecting element 44 by means of the latching unit.

The third method step 94 and the fourth method step 96 are provided to exchange the wiper blade 18 for a wiper blade, in particular another, in particular new or serviced wiper blade.

In a fifth method step 98 of the method 88, the cover unit 30 is pivoted from the open position 34 into the closed position 32, in particular by hand. In the fifth method step 98, the cover unit 30, in particular the cap element 52, is pivoted in relation to the wiper arm adapter 16 between the open position 34 of the cover unit 30 and the closed position 32 of the cover unit 30. In the fifth method step 98, the cap element 52 is pivoted from the open position 34 into the closed position 32. After the fifth method step 98, the cover unit 30 is in the closed position 32. After the fifth method step 98, the cover unit 30 is in the unlocked position 38.

In a sixth method step 100 of the method 88, the cap element 52 is transferred translationally from the unlocked position 38 into the locked position 40, in particular by hand, by means of the gripping structure 54. In the sixth method step 100, the cover unit 30 is locked by means of a translational movement between the unlocked position 38 of the cover unit 30 and the locked position 40 of the cover unit 30. In the sixth method step 100, the pivoting bearing elements 62, 64 are displaced translationally along the displacement axis 56 in the recesses 58, 60. In the sixth method step 100, the hook element 74 is displaced translationally along the displacement axis 56. In the process, the latching element 80 which is formed by the hook element 74 is coupled to the latching recess 82 of the wiper arm adapter 16. In the sixth method step 100, the further hook element 86 is displaced translationally along the displacement axis 56. In the process, the further hook element 86 is coupled to the retaining bracket 28. In the sixth method step 100, the cover unit 30 is permanently in the closed position 32. After the sixth method step 100, the cover unit 30 is in the locked position 40. After the sixth method step 100, the wiper device 10 is in the operationally ready state, in particular as before the first method step 92.

In principle, it is conceivable for the method 88 to be repeated, in particular after expiry of a defined use period of the wiper blade 18 and/or after expiry of defined operating cycles of the wiper blade 18.

What is claimed is:

1. A wiper device (10) having a wiper arm adapter (16) of a wiper arm, and having a cover unit (30) which is mounted on the wiper arm adapter (16) so as to be pivotable about a pivot axis (36) between an open position (34) and a closed position (32) and which, in the closed position (32), at least partially covers the wiper arm adapter (16) in relation to an environment, wherein the cover unit (30), in the closed position (32), is displaceable translationally between an unlocked position (38) and a locked position (40), wherein the cover unit (30) has a latching element (70) which is arranged on an inner side of the cover unit (30) that faces the wiper arm adapter (16), and which, in the closed position (32), is arranged in a latching formation (72) of the wiper arm adapter (16) and is provided to retain the cover unit (30) in the closed position (32), wherein the latching element (70) is an elevation along the inner side of the cover unit (30), and the latching formation (72) is a depression on an outer side of wiper arm adapter (16), wherein the latching element (70) is configured to remain within the depression in both the unlocked position (38) and the locked position (40) when the cover unit is in the closed position (32), and wherein the latching element (70) is configured, when in the unlocked position (38), to be moved out of the latching formation (72) by means of a manual action of force during the pivoting about the pivot axis (36).

2. The wiper device (10) according to claim 1, wherein the pivot axis (36) is oriented at least substantially perpendicularly to a displacement axis (56), wherein the cover unit (30) is displaceable along the displacement axis (56) between the locked position (40) and the unlocked position (38).

3. The wiper device according to claim 2, wherein the latching formation (72) provides a movement clearance in which the latching element (70) is movable along the displacement axis (56).

4. The wiper device (10) according to claim 1, wherein the cover unit (30) has at least one pivoting bearing element (62, 64) which engages in a recess (58, 60) of the wiper arm adapter (16) and is mounted in the recess (58, 60) so as to be displaceable translationally during a displacement of the cover unit (30) between the unlocked position (38) and the locked position (40).

5. The wiper device (10) according to claim 4, wherein the recess (58, 60) is in the form of an elongated hole.

6. The wiper device (10) according to claim 1, wherein the cover unit (30) comprises a hook element (74) which, in the closed position (32), engages in a further recess (76) of the wiper arm adapter (16).

7. The wiper device (10) according to claim 6, wherein the hook element (74) forms a latching element (80) which, in the locked position (40) of the cover unit (30), is provided to engage in a latching recess (82) of the wiper arm adapter (16) so as to translationally secure the cover unit (30).

8. The wiper device according to claim 7, wherein the recess (58, 60) is separate from the further recess (76), and wherein the latching recess (82) is separate from both the recess (58, 60), and the further recess (76).

9. The wiper device (10) according to claim 1, wherein the cover unit (30) has at least one spacer element (84) which is arranged on an inner side of the cover unit (30) facing the wiper arm adapter (16) and makes contact with the wiper arm adapter (16) at least in the locked position (40).

10. A method (88) for installation of a wiper device (10) according to claim 1, wherein the cover unit (30), in at least one method step (90, 100), is unlocked and/or locked by means of a translational movement between the unlocked position (38) of the cover unit (30) and the locked position (40) of the cover unit (30) and, in at least one further method step (92, 98), is pivoted in relation to the wiper arm adapter (16) between the closed position (32) of the cover unit (30) and the open position (34) of the cover unit (30).

11. The wiper device according to claim 1, wherein the wiper device is a window wiper device.

12. The wiper device according to claim 1, wherein the latching element (70) is configured to retain the cover unit (30) in the unlocked position (38).

13. The wiper device according to claim 1, wherein the cover unit (30) extends along a longitudinal axis (56) and includes a first end and a second end spaced from the first end along the longitudinal axis (56), wherein the pivot axis (36) intersects the longitudinal axis (56) at the first end, and wherein the latching element (70) is positioned closer to the first end than the second end.

14. The wiper device according to claim 1, wherein the depression is an elongate indentation in a side wall of the wiper arm adapter (16).

15. The wiper device according to claim 1, wherein the depression is surrounded on all sides by a side wall of the wiper arm adapter (16).

* * * * *